United States Patent [19]

Robertson

[11] Patent Number: 4,501,374
[45] Date of Patent: Feb. 26, 1985

[54] HAZARDOUS FLUID TANK WITH CHECK VALVE

[76] Inventor: S. Harry Robertson, 1024 E. Vista Del Cerro, Tempe, Ariz. 85281

[21] Appl. No.: 465,634

[22] Filed: Feb. 10, 1983

[51] Int. Cl.³ .................. B60K 15/04; B60K 15/08; B65B 39/02; B65D 25/20
[52] U.S. Cl. .................................. 220/86 R; 137/846; 137/850; 220/85 VS; 220/88 R; 296/1 C
[58] Field of Search ............. 220/86 R, 85 S, 85 VS, 220/88 R; 137/588, 590, 592, 850, 846, 848, 849, 850, 844; 285/397, 398, 399; 296/1 C

[56] References Cited

U.S. PATENT DOCUMENTS

| | | | |
|---|---|---|---|
| 1,640,880 | 8/1927 | Bushnell | 137/846 X |
| 2,465,628 | 3/1949 | Border . | |
| 2,576,192 | 11/1951 | Poznik | 220/86 R |
| 2,594,525 | 4/1952 | Walden . | |
| 2,625,031 | 1/1953 | Kreitchman . | |
| 2,986,098 | 5/1961 | Trout et al. . | |
| 3,072,145 | 1/1963 | Nelson . | |
| 3,118,468 | 1/1964 | Bochan . | |
| 3,216,575 | 11/1965 | Stuart . | |
| 3,298,370 | 1/1967 | Beatty et al. . | |
| 3,361,161 | 1/1968 | Schwartz . | |
| 3,369,666 | 2/1968 | Hultgren et al. . | |
| 3,429,108 | 2/1969 | Larson . | |
| 3,450,114 | 6/1969 | Miles . | |
| 3,465,595 | 9/1969 | Tansony . | |
| 3,478,922 | 11/1969 | Mole | 220/86 R |
| 3,626,713 | 12/1971 | Venable . | |
| 3,780,757 | 12/1973 | Jordan . | |
| 3,780,943 | 12/1973 | Lilja . | |
| 3,903,942 | 9/1975 | Vest | 220/86 R X |
| 4,079,952 | 3/1978 | Nishio | 220/86 R X |
| 4,135,562 | 1/1979 | Martineau | 220/86 R X |

FOREIGN PATENT DOCUMENTS

| | | | |
|---|---|---|---|
| 362024 | 10/1922 | Fed. Rep. of Germany | 220/86 R |
| 952137 | 11/1949 | France | 220/86 R |
| 2351029 | 12/1977 | France | 220/86 R |
| 659826 | 1/1964 | Italy | 220/86 R |
| 437395 | 10/1935 | United Kingdom | 220/86 R |
| 2060527 | 5/1981 | United Kingdom | 220/86 R |

Primary Examiner—Allan N. Shoap
Attorney, Agent, or Firm—Banner, Birch, McKie & Beckett

[57] ABSTRACT

A safety tank for hazardous fluids having a check valve is provided with a filler pipe inserted through a grommet providing a passage for fluids to the interior of the tank. A check valve integral with the grommet prevents reverse flow of the fluid out of the tank as might occur in an accident where the filler pipe or cap is forcibly removed. The tank can be applied to various uses, and existing tanks can be modified by the inclusion of a check valve to encompass the safety features of the present invention. Other embodiments of the tank are provided that include check valves which fit various tank inlet configurations.

12 Claims, 7 Drawing Figures

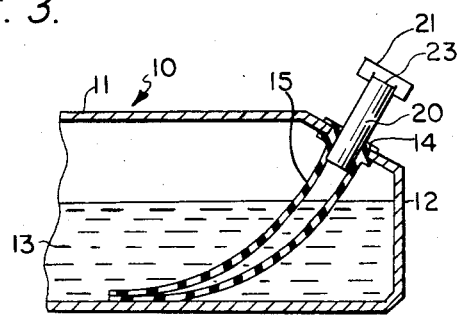
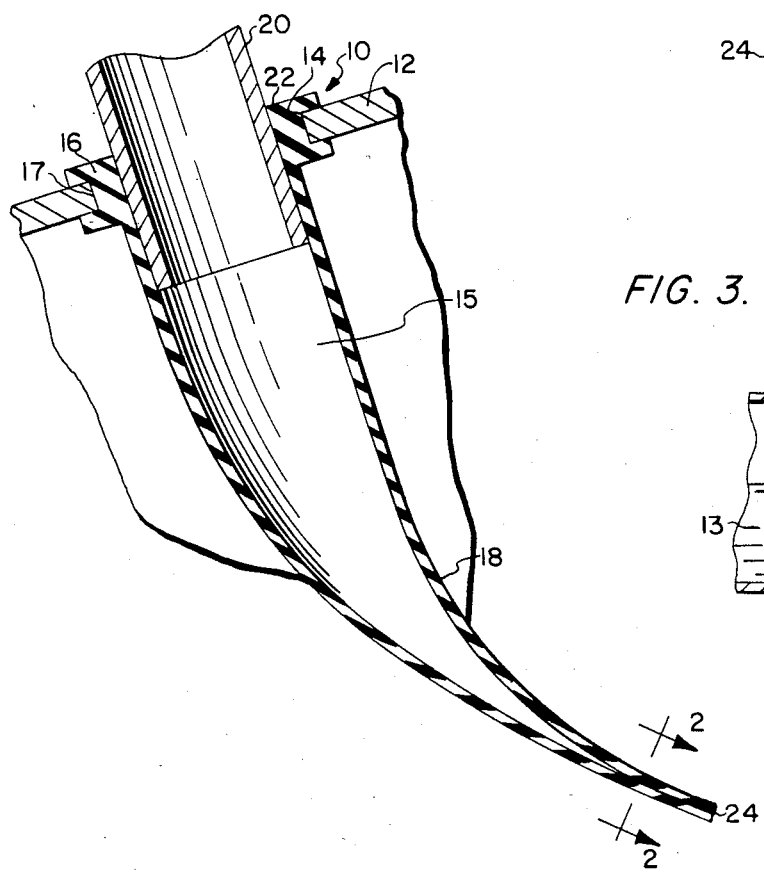
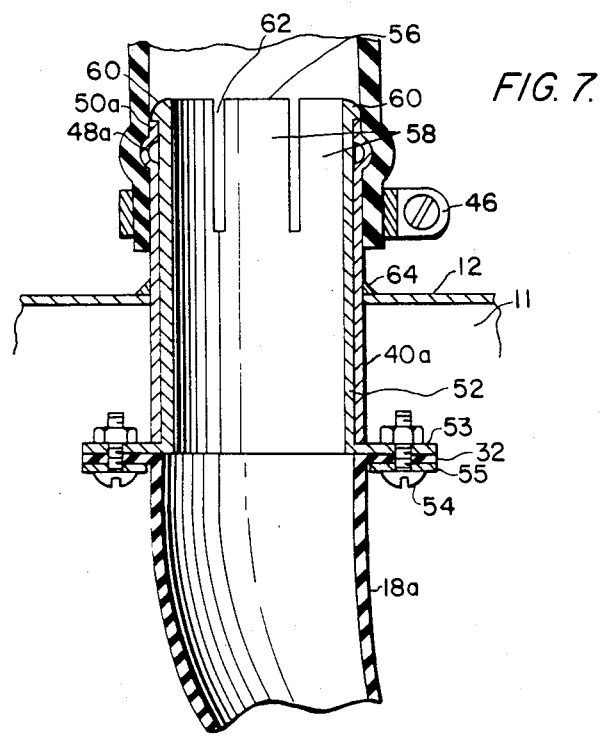

HAZARDOUS FLUID TANK WITH CHECK VALVE

TECHNICAL FIELD

The present invention relates to safety tanks for hazardous fluids and more particularly, to a fuel tank having a check valve that prevents fuel from escaping from the tank through the filler opening.

BACKGROUND OF THE INVENTION

Fuel or other types of tanks containing hazardous fluids often do not have check valves to prevent the unwanted exit of the fluids out of the tank. Rather, these tanks merely have grommets seated in the tank opening through which a filler pipe is inserted or have the filler pipe mounted directly to the tank.

It has been estimated that over half of the fires occurring in vehicle collisions are caused by fuel leaking out of the tank through the filler opening. Such leaks occur when the cap on the pipe is pried off or the pipe is forcibly drawn out of the grommet or the pipe is pulled off of the tank body. In all of the above instances, no barrier exists to block the path of the fuel out of the tank. As a result, it is highly likely that in a collision or other mishap fuel will leak out. Of course, the danger is equally as great if other types of hazardous fluids are contained in the tank. Should fuel be in the tank, leakage might lead to a fire that would seriously or fatally injure the occupants of the vehicle containing the tank.

Elastic check valves that permit fluid to flow in one direction but not in the reverse are well known in the art. Examples of U.S. patents on such check valves include U.S. Pat. Nos. 2,465,628; 2,986,098; 3,298,370; 3,361,161; 3,465,595; and 3,780,757. Yet, as was indicated earlier, check valves are not commonly included in tanks for hazardous fluids, especially vehicle fuel tanks. As a result, vehicle fires occur when fuel leaks from the tank. Thus, it is desirable to add to fuel and other types of tanks check valves, which are located inside the tank, to prevent dangerous leaks in the event the filler pipe or cap is removed unintentionally.

In addition, when attempting to retrofit fuel or other tanks with check valves, it also is desirable to provide valves which easily adapt to existing structures. Irregardless of the intended application, the check valve should be inexpensive to manufacture, easy to install and replace, and durable. Moreover, the valve should contain few moving parts to minimize the possibility of mechanical breakdown.

SUMMARY OF THE INVENTION

It is an object of the present invention to provide a safety tank for hazardous fluids having a check valve that prevents fluid from escaping from the tank through the filler opening.

It is another object of the present invention to provide such a tank with a valve that remains securely within the tank in the event the filler pipe or cap is removed unintentionally.

It is still another object of the present invention to provide such a tank with a valve that is easy to install and equally as easy to remove for replacement.

It is a further object of the present invention to provide such a tank with a valve that is durable and inexpensive to manufacture.

It is another object of the present invention to provide a check valve that can be adapted to fit existing tanks.

It is still another object of the present invention to provide a tank with a check valve that has no mechanical moving parts to wear and break down.

These and other objects are attained by a tank for hazardous fluids, such as vehicle fuel, defined by an encompassing wall. The wall has an opening formed in it to provide access to the interior thereof. In one embodiment, an annular grommet sealingly engages the wall at the opening. The grommet is adapted to sealingly receive an annular filler pipe which passes fuel to the interior of the tank. A check valve is sealingly attached to the grommet allowing fuel to pass from the filler pipe into the tank, but preventing reverse flow of the fluid out of the tank through the filler opening.

The check valve can comprise an elastic tube which is intergral with the grommet. The distal end of the tube normally is collapsed, but the pressure of fluid entering the tank through the filler opening expands the tube to permit passage of the fluid into the tank. The normally closed or collapsed portion of the tube prevents fluid from leaving the tank should the filler pipe or its cap ever be removed unintentionally, as might happen in a collision. Grooves can be included in the distal end of the tube to equalize the fluid level in the tube with the level in the tank.

In a second embodiment, the check valve can include a flange which fastens to a corresponding flange located on the grommet.

In a third embodiment, the grommet may be omitted, and the check valve can include a flange which, along with a corresponding flange located on the inlet filler, fasten to the tank wall.

In a fourth embodiment, the check valve can include a retaining ridge which lockingly engages the distal end of the inlet filler.

In a fifth embodiment, the check valve can be attached to a mounting member with locking arms that lockingly engage the distal end of the inlet filler.

The presently preferred way of carrying out the invention and various inherent advantages thereof will become apparent from the following description of several illustrative embodiments when read in conjunction with the accompanying drawing.

BRIEF DESCRIPTION OF THE DRAWINGS

FIG. 1 is a sectional view of a first embodiment of the tank at the filler opening.

FIG. 2 is a sectional view taken along line 2—2 of FIG. 1.

FIG. 3 is a sectional view of the tank showing a grommet check valve associated with a partially-filled tank.

FIG. 7 is a sectional view of a fifth embodiment of the tank at the filler opening.

DESCRIPTION OF THE PREFERRED EMBODIMENTS

Figure 6:
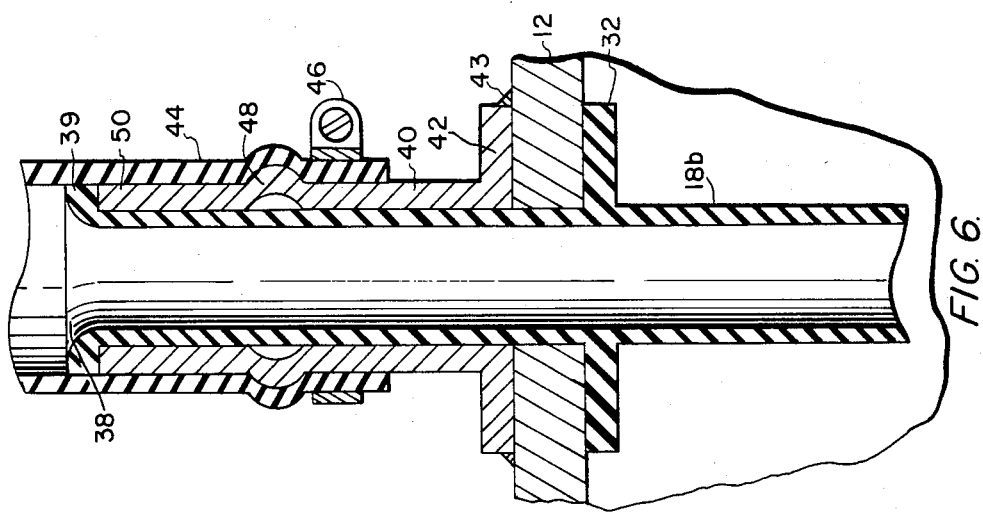
FIG. 6 is a sectional view of a fourth embodiment of the tank at the filler opening.

Referring to FIGS. 1-3, a fluid tank with a grommet check valve in accordance with a first embodiment of the present invention is illustrated and designated generally by reference numeral 10. The assembly includes a fluid tank 11 defined by an encompassing wall 12. Tank 11 can be of any shape or size, made of any suitable material, and hold any type of fluid. The tank in the illustrated embodiment is a metallic vehicle fuel tank.

A filler opening 14 is located in the wall 12 of tank 11 to provide access to the interior thereof so that fuel 13 can be placed in the tank.

Inserted into opening 14 is a grommet check valve 15, which includes a grommet 16 that has a slot 17 about its exterior circumference. Slot 17 engages tank wall 12 to form a seal through which fuel 13 cannot pass. Integrally formed and in fluid communication with grommet 16 is a flap check valve 18 which extends inwardly from grommet 16 into the tank interior. Check valve 18 is formed from an elongated tube having relatively little wall stiffness and is manufactured to normally remain in a collapsed configuration, at least at its end distal from grommet 16. It should be understood that although check valve 18 is illustrated as having uneven side lengths about the valve center line, valve 18 can be made in any appropriate shape, including a shape whereby both sides evenly collapse together.

Both grommet 16 and check valve 18 are made of a flexible material, such as rubber, synthetic elastomers, or cloth-impregnated rubber. Two materials which, because of their durability, work exceptionally well are buna-N rubber and flurosilicone. It should be pointed out that although the embodiment illustrated shows the grommet 16 and check valve 18 integrally formed, as will be discussed later, any arrangement whereby grommet 16 and check valve 18 are sealingly connected serves the function intended by the present invention. It is also important to note that the grommet design allows the grommet check valve to be placed into any type of filler opening, allowing easy retrofit of the valve to an existing tank.

Tank filler pipe 20 sealingly seats into grommet 16 at inlet end 22. FIG. 3 shows that a filler pipe cap 21 fits over distal pipe end 23 to close pipe 20. Pipe 20, which is in fluid communication with grommet check valve 15, acts as a conduit through which fuel 13 is inserted into the interior of tank 11 through valve 18. As can be seen from FIG. 1, distal end 24 of valve 18 normally is collapsed. Fuel 13, passing through pipe 20, expands distal end 24 by hydraulic pressure to gain entry into tank 11. When fuel 13 ceases to flow, however, end 24 again collapses, clamping off the path by which fuel 13 could escape from tank 11 in the event of a collision or other mishap.

As seen in FIG. 2, a number of small grooves 26 are located in distal end 24 of valve 18. Grooves 26 remain open even when end 24 is collapsed to allow the level of fuel in grommet check valve 15 to equalize with the level of fuel 13 in tank 11. Grooves 26 can be of any suitable size, shape or number. Also, grooves 26 can be located anywhere along the opening in distal end 24. Of course, the safety features of tank 11 would not be seriously diminished if grooves 26 were omitted from valve 18.

In operation, a nozzle or other fluid-directing device is inserted into distal pipe end 23 after cap 21 is removed. Fuel 13 passes through pipe 20 and grommet check valve 15 to be deposited into tank 11 from which it is drawn to power a vehicle. If an accident or collision occurs whereby filler pipe 20 is pulled or torn away from tank 11 or cap 21 removed, grommet check valve 15 remains within tank 11 to prevent any leakage of fuel from it. This prevents fuel from spilling out and creating a potential for dangerous fire.

It again should be noted that because of its convenient design, the grommet check valve can be inserted into any tank that has no check valve to make the tank safer in collisions and other mishaps. In addition, the grommet check valve can be easily and inexpensively manufactured. It is durable and, because of its unique design, has no moving mechanical parts that might wear and break down.

Figure 5:
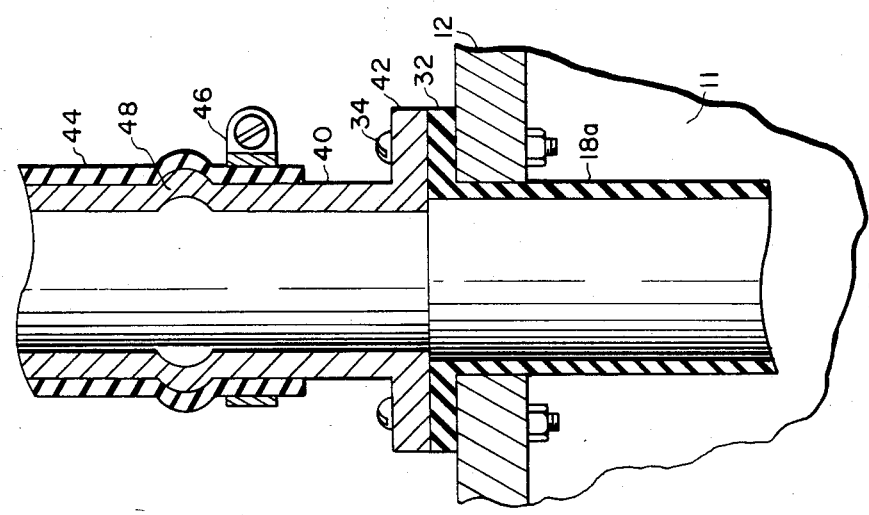
FIG. 5 is a sectional view of a third embodiment of the tank at the filler opening.
Figure 4:
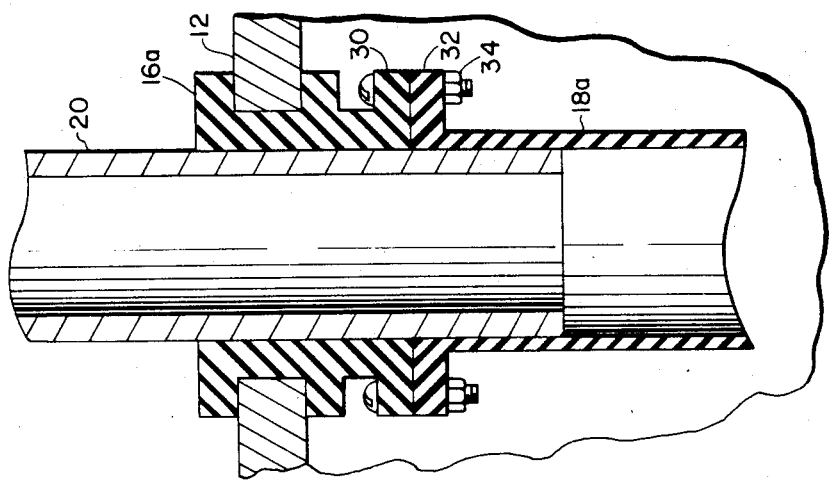
FIG. 4 is a sectional view of a second embodiment of the tank at the filler opening.

As shown in FIGS. 4, 5 and 6, alternative embodiments exist which allow the user great flexibility as to how a self-closing valve such as the check valve 18 will be mounted to the tank. In FIG. 4, grommet 16a has a flange 30 to which flange 32 of valve 18a is sealingly fastened by any suitable means. As shown, bolt means 34 secures the flange 32 of valve 18a to the flange 30 of grommet 16a. This second embodiment allows either grommet 16a or valve 18a to be replaced independent of one another.

FIG. 5 discloses a third embodiment in which grommet 16 is eliminated. In this embodiment, the fuel tank is in fluid communication with a filler neck (not shown) by means of a filler neck hose 44. An inlet filler 40 has a flange 42 which sealingly engages valve flange 32. Both inlet flange 42 and valve flange 32 fasten to tank wall 12, again by any suitable means, such as bolt means 34. As is standard and well known in the prior art, filler neck hose 44 is sealingly secured to inlet filler 40 by hose clamp 46. An inlet bead 48 located on inlet filler 40 acts in cooperation with clamp 46 to prevent hose 44 from becoming detached from inlet filler 40.

FIG. 6 discloses a fourth embodiment in which valve 18b has at an inlet end 38 an annular retaining ridge 39 which locking engages inlet filler 40 at its distal end 50. To mount valve 18b, the flexible valve walls are depressed inwardly and the inlet end 38 is inserted upwardly through filler 40. After retaining ridge 39 clears the distal end 50, the valve walls expand, firmly mounting valve 18b in place. Inlet filler flange 42, by which filler 40 can be mounted to tank wall 12 by any suitable means such as welds 43, and valve flange 32 abut tank wall 12 to stabilize the configuration. Omission of either flange, however, would not diminish the utility of the invention. Again, hose 44 is sealingly secured to inlet filler 40 by hose clamp 46 in cooperation with bead 48.

FIG. 7 discloses a variation of the embodiment illustrated in FIG. 6. Instead of having an annular retaining ridge, valve 18a instead has its flange 32 attached to a mounting member 52. Member 52 has a flange 53 which is secured to valve flange 32 by any suitable means, such as bolt means 54. An annular load distribution plate 55 is sandwiched between flange 32 and bolt means 54, thereby preventing overstress and deformation of flange 32. Mounting member 52 has at distal end 56 a number of retaining arms 58. Each arm 58 includes at end 56 a latch portion 60 that engages the distal end 50a of filler 40a. Member 52, which can be made of any suitable rigid material such as metal, plastic, or stiff rubber, has slots 62 between arms 58 to allow these arms to be pressed inwardly.

To mount valve 18a into tank 11, mounting arms 58 are depressed inwardly and inserted upwardly through inlet filler 40a. In the illustrated embodiment, filler 40a is secured to tank 11 by means of welds 64. Again, inlet hose 44 is attached to filler 40a by clamp 46 and bead 48a. When latch portions 60 clear inlet distal end 50a, they expand outwardly and lockingly engage filler 40a to hold member 52 and attached valve 18a firmly in place.

It should be noted that the third, fourth and fifth embodiments permit easy retrofit of existing tanks to include the features of the present invention and are used when an inlet hose 44 is attached to an inlet filler 40 or 40a. Should hose 44 be detached unintentionally from inlet 40 or 40a, or the filler cap removed, valve 18 or 18a will remain in tank 11 to prevent fuel from escaping. The third embodiment permits retrofit from the exterior of tank 11, while the fourth and fifth embodiments allow retrofit from the interior of tank 11 which might be required with some tank designs and locations in a vehicle.

Although numerous embodiments of the invention have been described in detail, it will be appreciated that various other alternative embodiments and modifications thereof are within the spirit and scope of the invention as defined by the appended claims.

I claim:

1. A safety tank for hazardous fluids comprising:
a tank for holding hazardous fluids on a vehicle;
an opening formed in the wall of said tank to provide access to the interior of said tank;
inlet filling means separably mounted on said tank at said opening to direct fluid into said tank interior, said filling means being vulnerable to separation from said tank upon occurrance of an accident involving the vehicle;
a tubular resilient check valve allowing fuel to pass into said tank from said filling means while blocking the path of fuel from said tank, said check valve comprising an elongated resilient tube normally collapsed at a distal end of said valve so that fluid passing through said filling means expands said tube for fluid passage into said tank and said tube collapses when fluid ceases to flow therethrough thereby preventing fluid from escaping from said tank; and
mounting means separable from the separable mounting of said inlet filling means and interconnecting said inlet filling means with said check valve, said mounting means fixedly mounting said check valve to said wall at said opening of said tank whereby upon said separation of said inlet filling means, said mounting means remains fixedly mounted to said tank to prevent fluid escaping from said tank.

2. A tank in accordance with the claim 1 wherein said valve has an inlet and outlet end, said inlet end having a retaining ridge whick lockingly engages with a filler fixedly secured to said tank wall at said opening to firmly mount said valve in place.

3. A tank in accordance with claim 2 where said filler and said valve include flanges that abut said tank wall.

4. A tank in accordance with claim 1 wherein said mounting means includes a filler fixedly secured to said tank wall at said opening and an annular mounting member, said member having a flange that abuts and is fastened by a fastening means to a corresponding flange on said valve, said member having a distal end provided with a plurality of locking arms separated by slots, said arms lockingly engaging with said filler at a filler distal end to firmly mount said member and said valve in place.

5. A tank in accordance with claim 4 wherein an annular load distribution plate is located between said valve flange and said fastening means to distribute the load placed on said flange at the location of said fastening means.

6. A tank in accordance with claim 1 wherein grooves are located at the distal end of said valve to equalize the level of fuel in said valve with the level of fuel in said tank.

7. A tank in accordance with claim 1 wherein said mounting means includes a flanged filler fixedly secured to said tank wall at said opening and said valve has a flange abutting the flange on said filler, said abutting flanges being fastened by fastening means to said tank wall.

8. A safety tank for hazardous fluids comprising:
a tank for holding hazardous fluids on a vehicle;
an opening formed in the wall of said tank to provide access to the interior of said tank;
an annular grommet sealingly engaging and fixedly secured to the perimeter of said opening in said wall, said grommet being adapted to sealingly receive an annular filler pipe to direct fluid to said tank interior;
an annular filler pipe sealingly and separably seated in said grommet to act as a conduit to direct fluid into the interior of said tank, said pipe being vulnerable to separation from said grommet upon occurrence of an accident involving the vehicle; and
a resilient check valve sealingly attached to said grommet to allow fluid to pass from said filler pipe into said tank, said check valve comprising an elongated resilient tube in fluid communication with said grommet, said tube normally being collapsed at a distal end of said valve so that fluid passing through said filler pipe expands said tube for fluid passage into said tank and said tube collapses when fluid ceases to flow therethrough thereby preventing fluid from escaping from said tank upon said separation of said pipe from said fluid grommet.

9. A tank in accordance with the claim 8 wherein said grommet and said check valve are integral.

10. A tank in accordance with claim 8 wherein said valve is sealingly mounted to said grommet.

11. A tank in accordance with claim 10 wherein said grommet and said valve include abutting flanges that are fastened together.

12. A tank in accordance with claim 8 wherein grooves are located at the distal end of said valve to equalize the level of fluid in said valve with the level of fluid in said tank.

* * * * *